(12) United States Patent
Roeckl (10) Patent No.: US 12,043,165 B2
(45) Date of Patent: Jul. 23, 2024

(54) METHOD FOR OPERATING A HIGH-RESOLUTION PROJECTION HEADLIGHT, AND PROJECTION HEADLIGHT FOR A MOTOR VEHICLE

(71) Applicant: PSA AUTOMOBILES SA, Poissy (FR)

(72) Inventor: Philipp Roeckl, Rüsselsheim am Main (DE)

(73) Assignee: PSA AUTOMOBILES SA, Poissy (FR)

(*) Notice: Subject to any disclaimer, the term of this patent is extended or adjusted under 35 U.S.C. 154(b) by 0 days.

(21) Appl. No.: 18/264,674

(22) PCT Filed: Jan. 25, 2022

(86) PCT No.: PCT/EP2022/051571
§ 371 (c)(1),
(2) Date: Aug. 8, 2023

(87) PCT Pub. No.: WO2022/175028
PCT Pub. Date: Aug. 25, 2022

(65) Prior Publication Data
US 2024/0034222 A1 Feb. 1, 2024

(30) Foreign Application Priority Data
Feb. 18, 2021 (DE) ...................... 10 2021 201 550.6

(51) Int. Cl.
*B60Q 1/14* (2006.01)
*H04N 9/31* (2006.01)

(52) U.S. Cl.
CPC ......... *B60Q 1/1407* (2013.01); *H04N 9/3155* (2013.01); *B60Q 2400/50* (2013.01)

(58) Field of Classification Search
CPC ................ G03B 21/16; G03B 21/2053; G03B 21/206; H04N 9/3155; H04N 9/3144;
(Continued)

(56) References Cited

U.S. PATENT DOCUMENTS

| 7,377,657 B2 * | 5/2008 | Morejon | ............... G09G 3/3413 353/121 |
| 9,572,223 B1 * | 2/2017 | Mula | ...................... H05B 45/22 |

(Continued)

FOREIGN PATENT DOCUMENTS

| EP | 3184884 A1 * | 6/2017 | ............... B60Q 1/04 |
| WO | 2018050593 A1 | 3/2018 | |
| WO | 2020260718 A1 | 12/2020 | |
| WO | WO-2020260718 A1 * | 12/2020 | ............ F21S 41/153 |

OTHER PUBLICATIONS

International Search Report to PCT/EP2022/051571 dated May 9, 2022.
Written Opinion to PCT/EP2022/051571 dated May 9, 2022.

*Primary Examiner* — John W Miller
*Assistant Examiner* — Humam M Satti
(74) *Attorney, Agent, or Firm* — Sandberg Phoenix & von Gontard P.C.

(57) ABSTRACT

The present invention relates to a method for operating a high-resolution projection headlight for a motor vehicle. The high-resolution projection headlight has an active LED pixel matrix light source which comprises an LED matrix monolithically integrated into a semiconductor chip with a plurality of light diode-based pixels and a driver circuit for separately controlling each individual pixel within the LED matrix. A current digital image of a sequence of images is continuously rasterized by means of a graphical controller from graphical data with at least one graphical object (50) and is provided for image reproduction with the projection headlight. A value for a thermal loading of the LED pixel (Continued)

matrix light source is continuously determined. During the rasterizing of a current digital image, surface areas (52) of the graphical objects (50) to be projected are at least partially masked with a masking (60, 61) and modulated, provided that the value for thermal loading exceeds a limit value. The invention also relates to a corresponding projection headlight system for a motor vehicle.

12 Claims, 5 Drawing Sheets

(58) Field of Classification Search
CPC ............... H04N 9/3182; H04N 9/3138; F21S 41/151; F21S 41/153; F21S 41/663; F21S 45/10; B60Q 1/1407; B60Q 2400/50; F21W 2103/60; F21W 2102/14; F21W 2105/00; H05B 45/18; G09G 2320/041
See application file for complete search history.

(56) References Cited

U.S. PATENT DOCUMENTS

| | | | |
|---|---|---|---|
| 2007/0070309 A1* | 3/2007 | Stern | H04N 9/3129 353/119 |
| 2010/0060861 A1* | 3/2010 | Medin | H04N 9/3144 353/57 |
| 2011/0242496 A1* | 10/2011 | Kimoto | G03B 21/16 353/30 |
| 2013/0009551 A1* | 1/2013 | Knapp | H05B 45/22 315/294 |
| 2016/0066386 A1* | 3/2016 | Catalano | H05B 45/56 315/309 |
| 2016/0073000 A1* | 3/2016 | Abelé | F21S 41/675 348/148 |
| 2016/0258611 A1* | 9/2016 | Takahashi | H04N 9/3188 |
| 2018/0144710 A1 | 5/2018 | Walker et al. | |
| 2018/0356062 A1* | 12/2018 | Mayer | F21S 41/265 |
| 2020/0380779 A1* | 12/2020 | Khazov | G06T 17/20 |
| 2021/0148536 A1* | 5/2021 | Roels | F21S 45/47 |

* cited by examiner

METHOD FOR OPERATING A HIGH-RESOLUTION PROJECTION HEADLIGHT, AND PROJECTION HEADLIGHT FOR A MOTOR VEHICLE

CROSS-REFERENCE TO RELATED APPLICATIONS

This application is the US National Stage under 35 USC § 371 of International Application No. PCT/FR2022/051571, filed Jan. 25, 2022, which claims the priority of German application 102021201550 filed on Aug. 18, 2022, the content (text, drawings and claims) of both said applications being incorporated by reference herein.

BACKGROUND

The methods and devices described herein relate to a method of operating a high-resolution projection headlight and a projection headlight system for a motor vehicle, and to a computer program and computer program product therefor.

High-resolution projection systems with separately controllable and actively illuminating pixel light sources represent the next step in the field of advanced lighting systems in automotive engineering. With pixel-based lighting elements, depending on a suitably high resolution, it is possible to project symbols, geometries and sharp as well as well accentuated light distribution patterns into the environment of a motor vehicle. For this purpose, new light-emitting semiconductor chips were introduced, so-called HDSSL (high definition solid state light source) chips, which comprise a large number of light-emitting diodes monolithically integrated on a semiconductor chip and arranged in a matrix or array. The light-emitting diodes arranged in rows and columns provide actively illuminated pixels, each of which can have an area on the order of 100 μm×100 μm, for example.

This high integration density of actively illuminated LED-based pixels in an LED matrix, which on the one hand achieves high image resolutions, on the other hand bears the risk of thermal defects in the HDSSL chips. Particularly when a large number of pixels are activated simultaneously, there is a high thermal power dissipation on a relatively small chip area.

To prevent thermal defects, it is known to control the electrical supply power for the LED matrix depending on the temperature. By down-regulating the common supply power for all pixels within an LED matrix, the luminous intensity of all active LEDs or all pixels within the LED matrix is unfortunately reduced as well as the thermal power dissipation of an HDSSL chip. A light distribution projected in the surrounding of a respective motor vehicle thus appears darker overall, so that the brightness contrast between the projection and the surrounding becomes lower.

SUMMARY

With this in mind, the object is to provide an alternative method and device for preventing thermal defects in such HDSSL chips without compromising brightness contrast between a projection and a surrounding.

Accordingly, a method in accordance with the main claim is proposed, as well as a device, a computer program, and a computer program product in accordance with the subsidiary claims. Further embodiments are the subject matter of the respective dependent claims.

In accordance with a first aspect, the object is solved by a method of operating a high-resolution projection headlight for a motor vehicle. The high-resolution projection headlight comprises an active LED pixel matrix light source which comprises an LED matrix monolithically integrated into a semiconductor chip with a plurality of light diode-based pixels and a driver circuit for separately controlling each individual pixel within the LED matrix. With a graphics controller, an up-to-date digital image of a sequence of images from graphics data is continuously rasterized with at least one graphics object and made available for image reproduction with the projection headlight. During this process, a value for a thermal load of the LED pixel matrix light source is continuously determined so that, during rasterization of a current digital image, surface areas of graphic objects to be projected are at least partially masked with a masking and modulated if the value for the thermal load exceeds a limit value.

An insight behind the method is that a large number of simultaneously activated pixels within a contiguous area on a HDSSL chip surface, causes a high local temperature input. Therefore, one idea is to reduce the thermal power dissipation primarily in these surface areas on the chip of the LED matrix.

In accordance with a further development of the method, lines of the current digital image of the graphical objects to be projected can be rasterized with a predetermined line width.

Thus, another idea is that the pixels activated on the chip surface for the projection of corresponding lines cause a lower power dissipation per chip area than the surface areas. Particularly in the case of fine lines with a width of only a few pixels, there is no need to limit the power or power dissipation for thermal protection.

In accordance with a further development of the above aspects, a dot mask can be provided as a masking so that, during rasterizing the surface areas of the graphical objects to be projected, one pixel of each two adjacent pixels of the current digital image is masked out and one pixel is rasterized in accordance with the respective graphical data of the graphical objects to be projected.

The masking can substantially be understood as a set of data stored in the graphical controller that is used to modulate the graphical data for the surface areas of the graphical objects when rasterizing a current digital image. In accordance with the further embodiment, every second pixel within a rasterized surface area is to be deactivated in order to halve the thermal power dissipation density in the LED matrix during image rendering in the corresponding surface areas on the chip of the LED matrix. The dot mask thus represents a checkerboard masking pattern in which every second pixel is masked out row by row and column by column and deactivated during image reproduction.

A checkerboard masking pattern ensures a homogeneous temperature input with respect to the luminous surface areas of the LED matrix.

In accordance with a further development, a first masking pattern and a second masking pattern can be provided as masking, so that in an image sequence of current digital images, the first masking pattern and the second masking pattern are used alternately during rasterizing the respective current digital image.

In particular, the second masking pattern can be used to provide masking that is inverse to the first masking pattern.

For example, with two mutually inverse checkerboard masking patterns used alternately in time to rasterize a sequence of current digital images, the temperature input is distributed even more uniformly with respect to the chip surface of the LED matrix.

According to a further aspect, the object is solved by a projection headlight system for a motor vehicle having a graphical controller and at least one high-resolution projection headlight. The high-resolution projection headlight has an active LED pixel matrix light source that comprises an LED matrix monolithically integrated into a semiconductor chip with a plurality of light diode-based pixels and a driver circuit for separately controlling each individual pixel within the LED matrix. The graphical controller has a computing unit and a memory means, wherein graphical data for at least one graphical object to be projected and at least one masking data set is stored in the memory means. The computing unit is designed to modulate the graphical data with the masking data set in such a way that, during rasterizing a current digital image for projection with the high-resolution projection headlight, masking occurs at least partially in surface areas of the graphical objects to be projected.

In accordance with a further aspect of the preceding aspect, the graphical controller may be further configured to determine a thermal loading on the LED pixel matrix light source.

Thus, a modulation of the graphical data and an at least partial masking of the surface areas can be performed depending on the thermal loading of the LED pixel matrix light source.

It may further be provided that a first masking data set and a second masking data set are stored in the memory means, wherein the second masking data set contains a masking pattern inverse to the first masking data set.

According to a further aspect, the object is solved by a computer program which, when executed on a computing unit within a graphical controller, instructs the respective computing unit to execute the method.

According to another aspect, the object is solved by a computer program product comprising a program code for performing the method stored on a computer readable medium.

BRIEF DESCRIPTION OF THE FIGURES

Further features and details are given in the following description, in which at least one example of an embodiment is described in detail, if necessary with reference to the drawing. Described and/or illustrated features form the subject matter by themselves or in any meaningful combination, if necessary also independently of the claims, and may in particular additionally also be the subject matter of one or more separate applications. Identical, similar and/or functionally identical parts are provided with the same reference numerals. In the figures:

DETAILED DESCRIPTION

Figure 1:
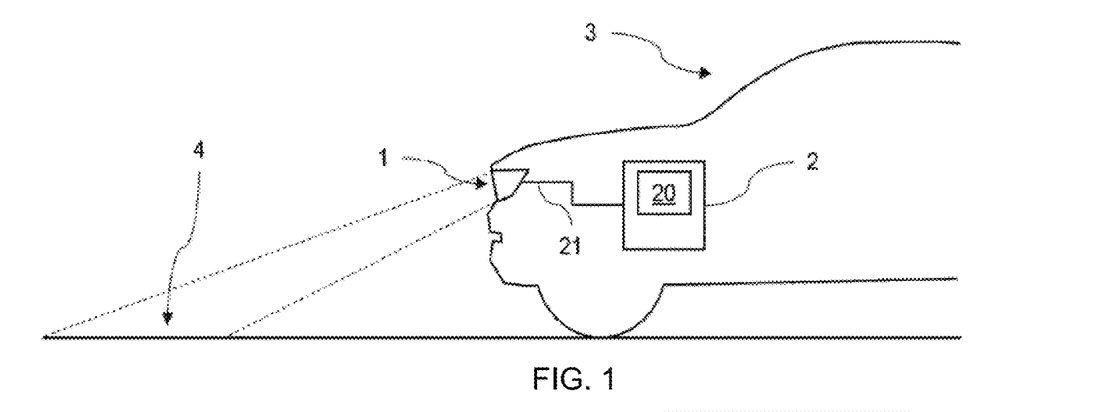
FIG. 1 shows a motor vehicle with a high-resolution projection headlight.

FIG. 1 shows a motor vehicle 3 with a high-resolution (HD) projection headlight 1 and an associated headlight control unit 2. The HD projection headlight 1 can combine various light sources with associated optical elements for different lighting functions in a common housing. An ordinary passenger car (passenger car) has a front lighting system with at least one right and one left main headlight, which provide at least a low beam and a high beam. Both main headlights are controlled in a synchronized manner by a common headlight control unit 2.

In the motor vehicle 3 outlined, at least one of the two main headlights is designed as an HD projection headlight 1 which, in addition to low beam and high beam devices, also has a high-resolution projection module with which an image 4 with one or more graphical objects, for example symbols, characters, auxiliary lines or any other geometric structures, can be projected onto a road surface in front of the motor vehicle 3.

Figure 2:
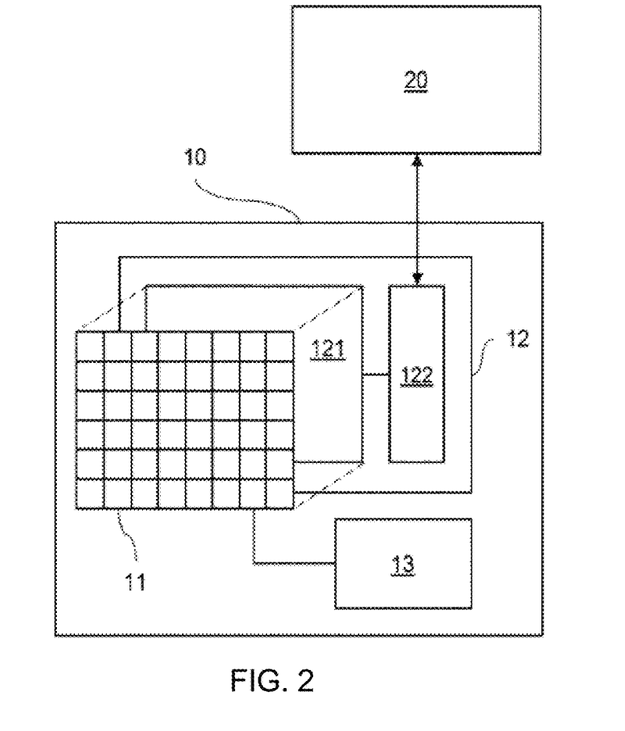
FIG. 2 shows an active LED pixel matrix light source of the high-resolution projection headlight.

In addition to projection optics, the high-resolution projection module has an active LED pixel matrix light source 10, an example of which is shown in FIG. 2. The active LED pixel matrix light source 10 mainly comprises two semiconductor chips. A plurality of light emitting diodes are monolithically integrated into a first semiconductor chip, which are arranged in an m×n LED matrix 11, i.e., row- and column-wise next to one another.

A second semiconductor chip contains an integrated driver circuit 12 for controlling each of the individual light emitting diodes within the LED matrix 11. The driver circuit 12 has a first circuit block 121 with a number of m×n transistors and forms a contact pad in the metallization plane above the first circuit block 121. The first semiconductor chip with the LED matrix 11 is fastened to the contact pad of the second semiconductor chip by means of flip-chip bonding. Each transistor of the integrated driver circuit 12 is assigned to one light emitting diode of the LED matrix 11. The light emitting diodes each represent an actively lit pixel of the LED matrix 11. Temperature sensors may further be provided in the first circuit block 121, which may be used to sense the chip temperature of the interconnected first and second semiconductor chips.

In a second circuit block 122, a control logic is arranged to communicate with a graphical controller 20 via a data link 21. An image data signal may be received by the graphical controller 20, which is used to individually control the individual transistors in the first circuit block by rows or columns. By means of pulse width modulation (PWM), each assigned light emitting diode can be operated at different brightness levels.

The active LED pixel matrix light source 10 further has a switching regulator 13 that provides a constant current source for the light emitting diodes of the LED matrix 11. The power of the constant current source can be regulated by means of a further pulse width modulation (PWM). The basic brightness of the entire LED matrix can thus be set or regulated using a PWM signal.

Figure 3:
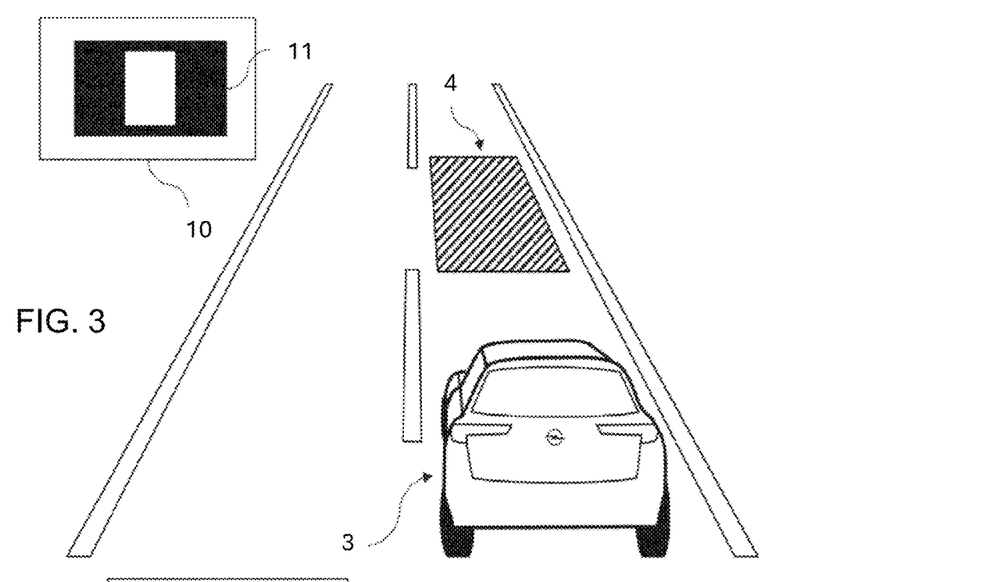
FIG. 3 shows a roadway with a motor vehicle and a high-resolution light distribution pattern.

FIG. 3 shows a possible application example of the HD projection headlight 1 with the active LED pixel matrix light source 10. The motor vehicle 3 is traveling in the right lane of a roadway. The HD projection headlight 1 is used to project a high-resolution image 4 or a light distribution pattern onto the roadway at a certain distance in front of the motor vehicle 3. Image 4 contains a rectangular structure projected into a path ahead of motor vehicle 3. The width, i.e., in the transverse direction to the roadway, of this rectangular structure projected as image 4 substantially corresponds to the width of the motor vehicle 3. This provides a driver assistance function that enables a driver to better estimate the width and position of his own vehicle in relation to a lane ahead. Such an assistance function can be particularly helpful in narrowed lanes, which can occur in road construction sites, for example.

In view of the active LED pixel matrix light source 10 outlined in FIG. 3, it becomes clear that a plurality of adjacent pixels or luminous ions of the LED matrix 11 integrated into the first semiconductor chip are activated for the projection of the rectangular structure. In this operating state, the chip with the LED matrix 11 has a large contiguous luminous area so that there is a high power density within the corresponding chip area. This results in a high thermal density within the luminous area in the chip center. In particular, when such image reproduction occurs over an extended period of time, the active LED pixel matrix light source 10 is at risk of thermal damage.

In accordance with prior art, it is therefore provided to monitor the temperatures within the active LED pixel matrix light source 10 by means of sensors. If a temperature limit is exceeded, the power of the constant current source for supplying electrical energy to the light emitting ions within the LED matrix 11 can be regulated down by means of PWM. As the electrical supply power is reduced, the thermal power dissipation within the LED matrix 11 is also reduced, thus protecting the active LED pixel matrix light source 10 from thermal damage. Unfortunately, when the supply power is regulated down, the brightness of all illuminated pixels of the LED matrix 11 is also dimmed down, so that the image 4 projected onto the roadway appears darker overall and appears less rich in contrast to the surrounding area.

Figure 4:
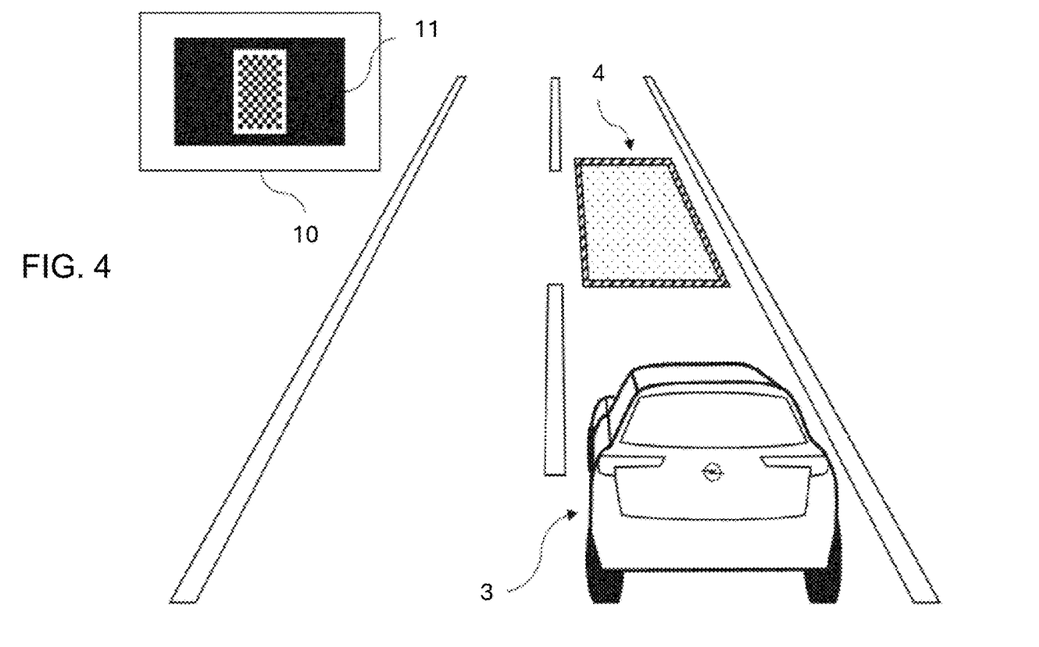
FIG. 4 shows a roadway with a motor vehicle and a modulated and at least partially masked light distribution pattern.

This is where the method for operating a high-resolution projection headlight comes into play. As can be seen in FIG. 4, one objective is not to reduce the electrical supply power for the entire semiconductor chip with the LED matrix 11, and thus for all pixels equally, but to specifically reduce the thermal power dissipation density in critical areas on the chip surface with the LED matrix 11. As shown in FIG. 4, for example, the contour of the rectangular structure can and should be projected onto the asphalt with full illuminance, while the inner surface area projected as image 4 is reduced in brightness as soon as, for example, a threshold value of a chip temperature is reached.

In view of the active LED pixel matrix light source 10 outlined in FIG. 4, it becomes clear that a closed line with activated pixels lights up in the edge area of the rectangular structure to be projected. A checkerboard pattern of luminous and non-luminous LEDs of the LED matrix 11 is visible in the surface of the projecting structure. One idea behind this is to reduce the number of pixels of the LED matrix 11 that are illuminated simultaneously in a contiguous surface area so that, over the surface area and averaged over time, less power dissipation and waste heat is introduced into the semiconductor chips of the active LED pixel matrix light source 10. By contrast, the pixels representing an outer line of the structure to be projected are not reduced in luminosity. As a result, the image 4 projected onto the roadway has an unchanged high contrast to the unlit outer environment, while the heat dissipation power density in the LED matrix 11 can be reduced by almost half.

Figure 5:
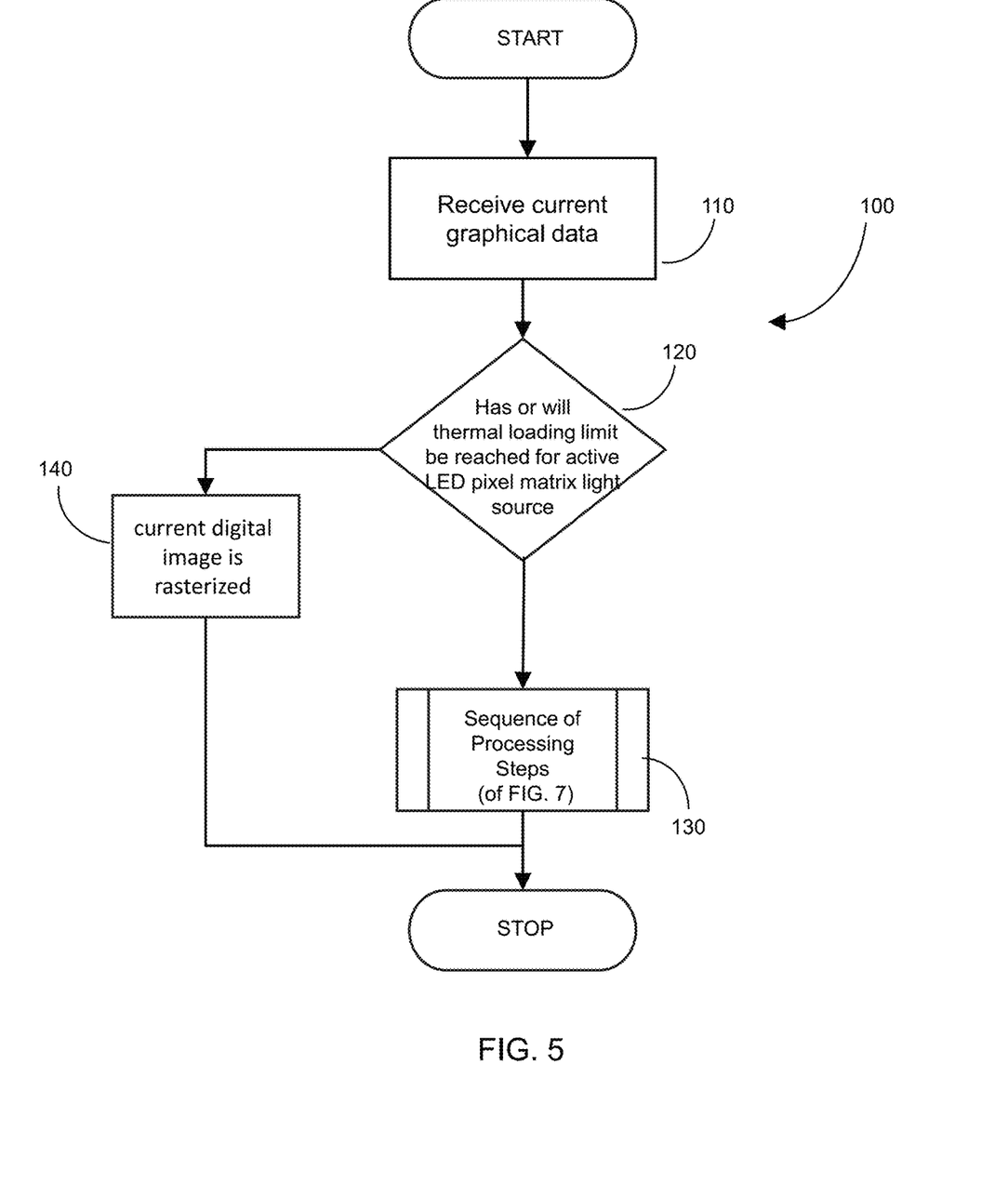
FIG. 5 shows a method sequence for rasterizing a digital image for image reproduction with an HD projection headlight.

In particular, these aspects can be achieved using the method described below and illustrated in FIG. 5 for rasterizing a digital image for image reproduction with an HD projection headlight 1.

In a first step 110, current graphical data including at least one graphical object is received from graphical controller 20 or loaded from a data memory. The graphical object(s) may be pixel and/or vector graphical data. In a second step 120, the graphical controller 20 determines whether a thermal loading limit has been or will be reached for the active LED pixel matrix light source 10.

A determination of the thermal loading limit of the active LED pixel matrix light source 10 can be carried out in different ways. On the one hand, via the data link 21, temperature data from the control logic of the second circuit block 122 could be received, which is compared to a temperature limit value stored in the graphical controller 20. Alternatively, a thermal loading can be calculated from a history of rasterized digital images that have been rasterized within a defined time interval prior to a current digital image and have been reproduced with the HD projection headlight 1. That is, a thermal power dissipation introduced into the active LED pixel matrix light source 10 could be estimated by the number and time duration of the illuminated pixels.

Provided that, in the second step 120, no reaching or exceeding of the thermal loading limit has been determined, in a final step 140 a current digital image is rasterized from the current pixel and/or vector graphical data, which is adapted to the resolution of the LED matrix 11 for image reproduction and can be transmitted as an image signal via the data link 21 to the control logic of the active LED pixel matrix light source 10 of the HD projection headlight 1.

By contrast, if, in the second step 120, it has been determined that the thermal stress limit has been reached or exceeded, the graphical objects present as pixel and/or vector graphical data are processed in accordance with a sequence of steps 130.

Figure 7:
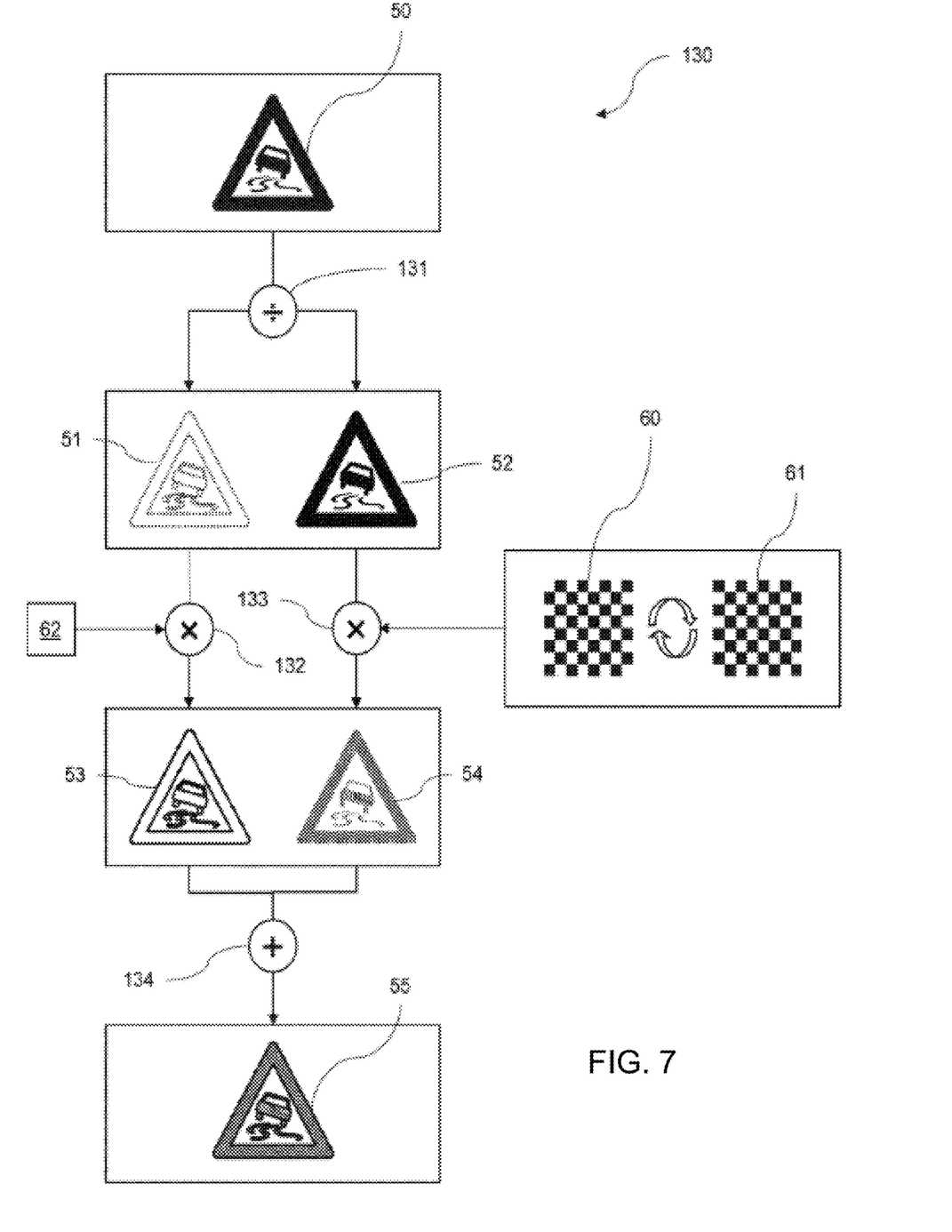
FIG. 7 shows a sequence of steps for rasterizing a current digital image.

FIG. 7 is used to illustrate the sequence of steps 130 by way of example. Current graphical data representing a symbol 50 to be projected in front of the motor vehicle 3 is stored in a working memory of the graphical controller 20. In a first sub-step 131, the symbol 50 is split into lines 51 and surface areas 52. The lines 51 of the symbol 50 are rasterized in a second sub-step 132 with a predetermined line width 62 for the resolution of the LED matrix 11. In a parallel second sub-step 133, the surface areas 52 of the symbol 50 are rasterized for the resolution of the LED matrix 11. For this purpose, a dot mask 60 is provided which is stored as a data set in the graphical controller 20 and which can be used to mask every other pixel in a checkerboard-like structure corresponding to the resolution of the LED matrix 11. During rasterizing, the surface areas 52 are modulated using the dot mask 60 so that each of the masked pixels is deactivated and thus only every other pixel is active in the rasterized surface areas 54.

In addition, an inverse dot mask 61 is provided by the graphical controller 20 so that it is possible to alternately switch between the dot mask 60 and the inverse dot mask 61 for rasterizing a sequence of images.

The rasterized lines 53 and the rasterized surface areas 54 are superimposed in a final sub-step 134 to form a rasterized digital image 55. Finally, the rasterized digital image 55 may be transmitted as an image signal to the control logic of the active LED pixel matrix light source 10 of the HD projection headlight 1 via the data link 21.

Figure 6:
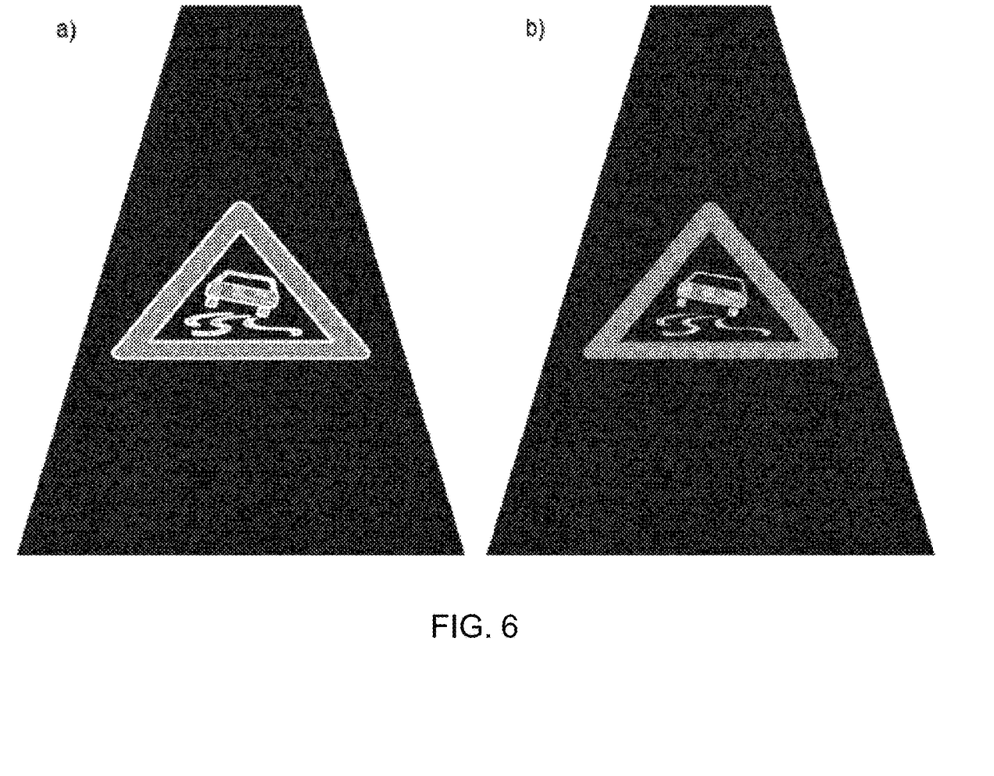
FIG. 6 shows a first and second image reproduction of a HD projection headlight.

FIG. 6a outlines an image reproduction using the HD projection headlight 1 of a method described above. In order to reduce the thermal power dissipation in the active LED pixel matrix light source 10, only the surface areas of a symbol are reduced in brightness by alternately blanking out approximately half of the pixels in a sequence of images in time and space. The lines of the symbol are illuminated with maximum brightness, so that a maximum contrast to the surroundings is achieved.

In comparison, FIG. 6b shows an image reproduction of the symbol when the power of the constant current source for supplying all pixels of an LED matrix is regulated down. Comparatively, the contrast to the surroundings is significantly reduced.

Although the subject matter has been further illustrated and explained in detail by embodiments, the claimed invention is not limited by the disclosed examples and other variations may be derived therefrom by the person skilled in the art. It is therefore obvious that a wide number of possible variations exists. It is also obvious that exemplary embodiments are only examples which are not to be understood in any way as limiting the scope, the possible applications or the configuration, for example. Rather, the foregoing description and the figure description enable the person skilled in the art to implement the exemplary embodiments in a concrete manner, wherein the person skilled in the art, being aware of the disclosed inventive idea, can make a variety of changes, for example with regard to the function or the arrangement of individual elements mentioned in an exemplary embodiment, without leaving the scope defined by the claims and their legal equivalents, such as further explanations in the description.

The invention claimed is:

1. A method for operating a high-resolution projection headlight for a motor vehicle, wherein the high-resolution projection headlight comprises an active LED pixel matrix light source which comprises an LED matrix monolithically integrated into a semiconductor chip with a plurality of light diode-based pixels and a driver circuit for separately controlling each individual pixel within the LED matrix, wherein a current digital image of a sequence of images is continuously rasterized by means of a graphical controller from graphical data with at least one graphical object and is provided for image reproduction with the projection headlamp, wherein a value for a thermal loading of the LED pixel matrix light source is continuously determined, so that, during rasterizing of a current digital image, surface areas of the graphical objects to be projected are at least partially masked with a masking and modulated, provided that the value for the thermal loading exceeds a limit value.

2. The method in accordance with claim 1, wherein lines of the graphical objects to be projected are rasterized with a predetermined line width.

3. A method in accordance with claim 1, wherein a dot mask is provided as masking, so that, during rasterizing the surface areas of the graphical objects to be projected, one pixel of each two adjacent pixels of the current digital image is masked out and respectively one pixel is rasterized in accordance with the respective graphical data of the graphical objects to be projected.

4. The method in accordance with claim 1, wherein a first masking pattern and a second masking pattern are provided as masking such that, in an image sequence of current digital images, the first masking pattern and the second masking pattern are each alternately used during rasterizing the respective current digital image.

5. The method in accordance with claim 4, wherein the second masking pattern provides a masking inverse to the first masking pattern.

6. A projection headlight system for a motor vehicle having a graphical controller and at least one high-resolution projection headlight, wherein the high-resolution projection headlight has an active LED pixel matrix light source which comprises an LED matrix monolithically integrated into a semiconductor chip with a plurality of light diode-based pixels and a driver circuit for separately controlling each individual pixel within the LED matrix, wherein the graphical controller has a computing unit and a memory means, wherein graphical data for at least one graphical object to be projected and at least one masking data set are stored in the memory means, and wherein the computing unit is designed to modulate the graphical data with the masking data set in such a way that, during rasterizing of a current digital image for projection with the high-resolution projection headlight, masking occurs at least partially in surface areas of the graphical objects to be projected.

7. The projection headlight system in accordance with claim 6, wherein the graphical controller is further configured to determine a thermal loading on the LED pixel matrix light source.

8. The projection headlight system in accordance with claim 6, wherein a first masking data set and a second masking data set are stored in the memory means, wherein the second masking data set contains a masking pattern inverse to the first masking data set.

9. A computer program stored on a non-transitory computer readable medium that, when executed on a computing unit within a graphical controller, instructs the respective computing unit to perform a method in accordance with claim 1.

10. A computer program product with a program code stored on a non-transitory computer readable medium for performing the method in accordance with claim 1.

11. The method in accordance with claim 1, wherein thermal loading of the LED pixel matrix light source is calculated from a history of rasterized digital images that have been rasterized within a defined time interval prior to the current digital image and have been reproduced with the high-resolution projection headlight.

12. The projection headlight system in accordance with claim 6, wherein thermal loading of the LED pixel matrix light source is calculated from a history of rasterized digital images that have been rasterized within a defined time interval prior to the current digital image and have been reproduced with the high-resolution projection headlight.

* * * * *